UNITED STATES PATENT OFFICE.

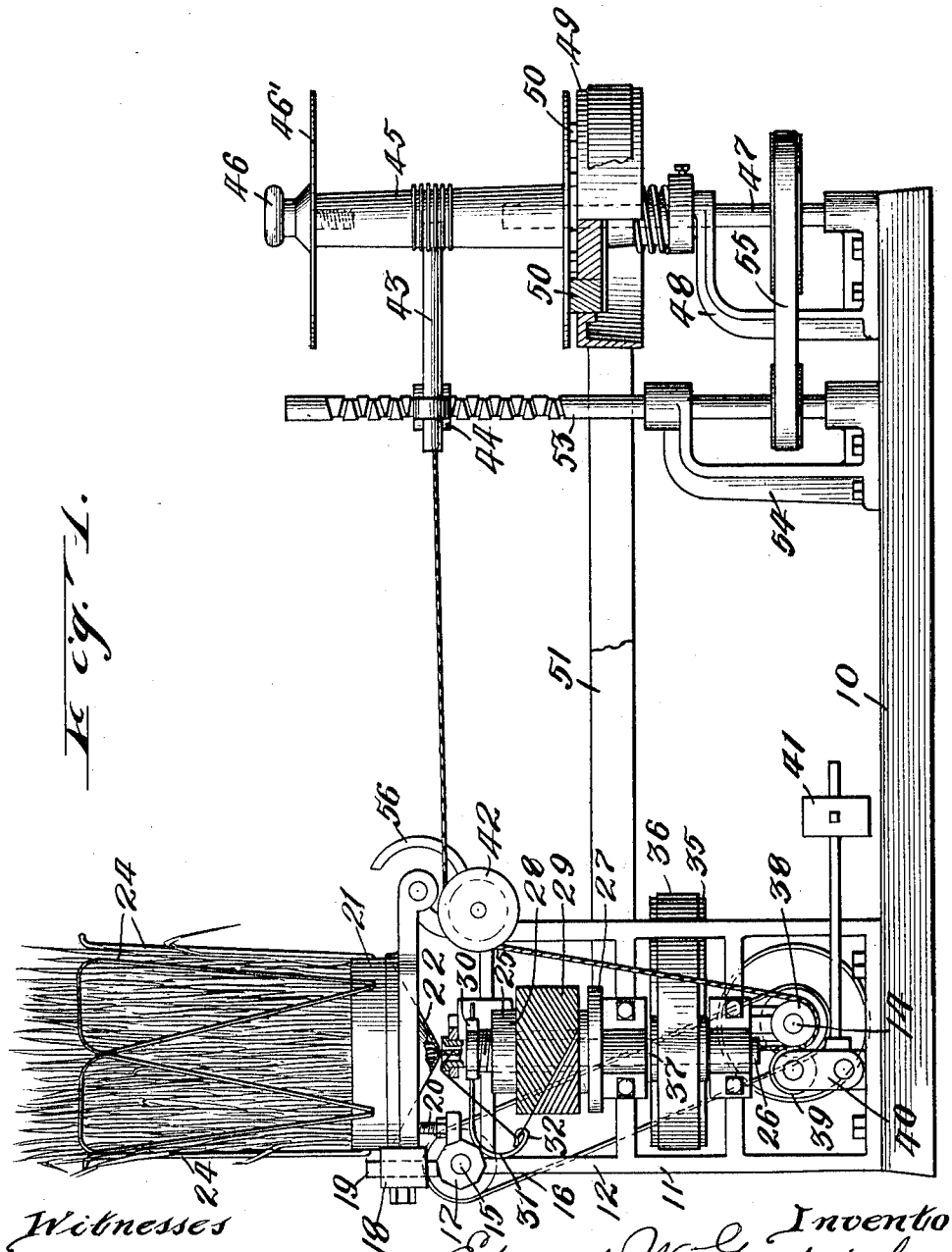

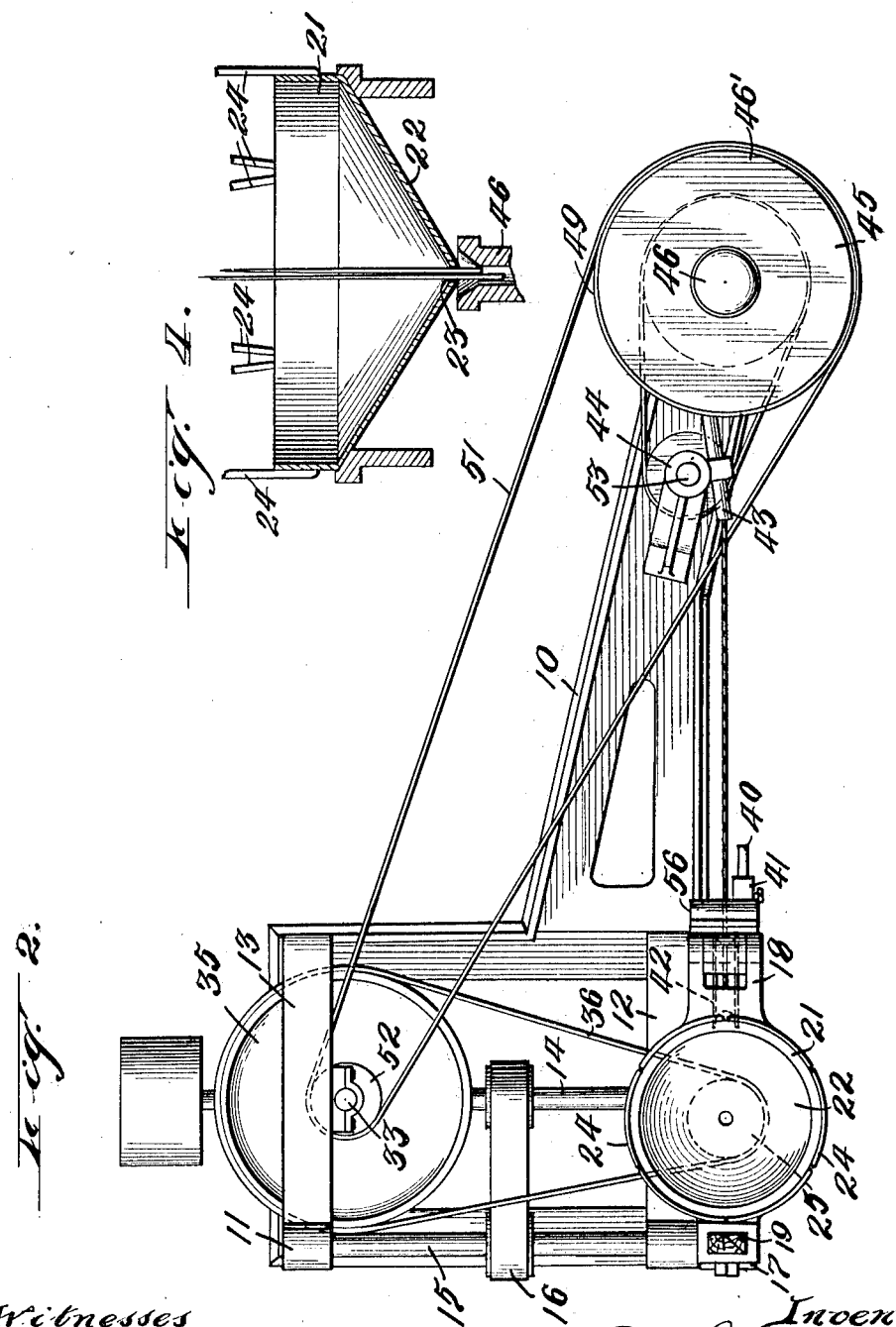

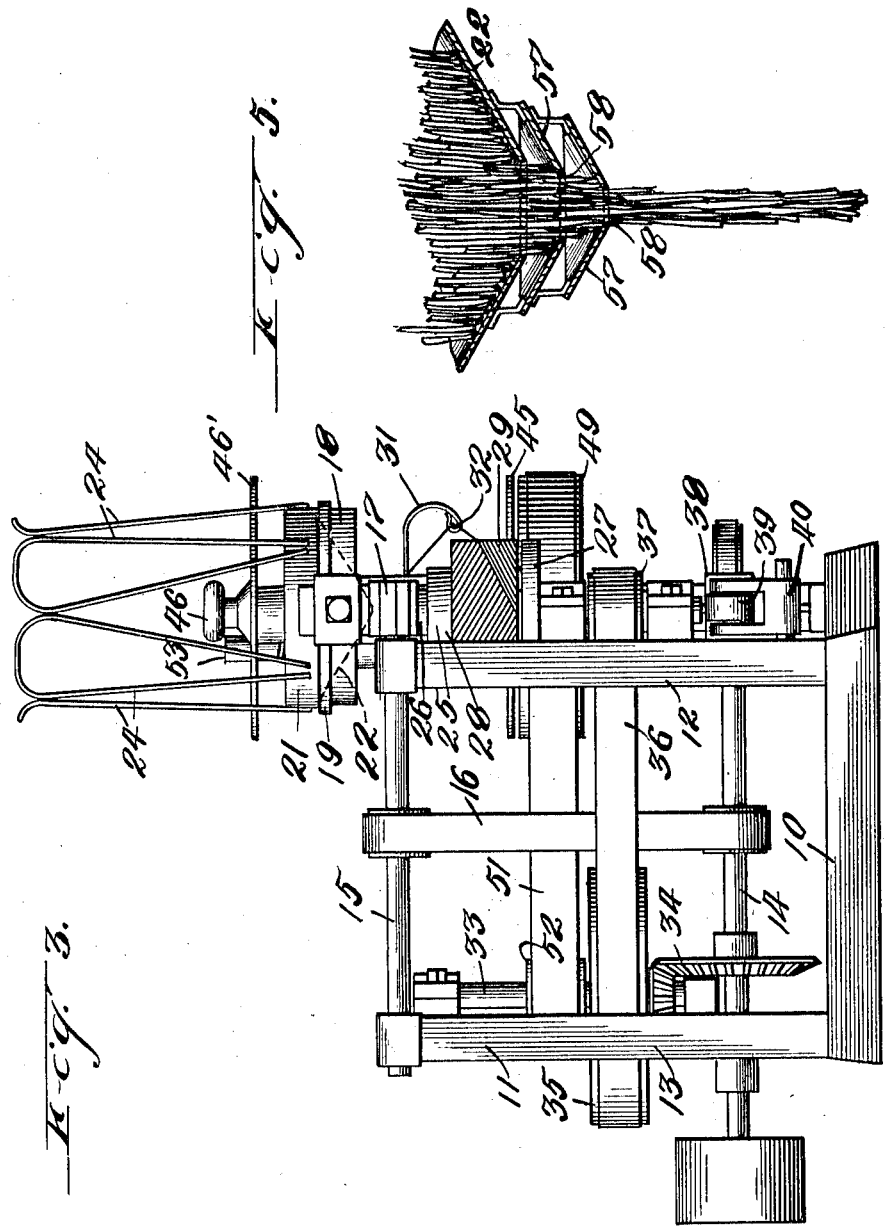

EDWARD W. GOODRICK, OF OSHKOSH, WISCONSIN, ASSIGNOR TO WISCONSIN GRASS RUG AND CARPET COMPANY, OF FOND DU LAC, WISCONSIN, A CORPORATION OF WISCONSIN.

GRASS-TWINE MACHINE.

1,048,686.  Specification of Letters Patent. Patented Dec. 31, 1912.

Application filed May 5, 1910. Serial No. 559,528.

*To all whom it may concern:*

Be it known that I, EDWARD W. GOODRICK, residing in Oshkosh, in the county of Winnebago and State of Wisconsin, have invented new and useful Improvements in Grass-Twine Machines, of which the following is a description, reference being had to the accompanying drawings, which are a part of this specification.

This invention relates to improvements in grass twine machines and has for its object to provide a simple and efficient machine especially adapted for making grass twine from marsh or other grass, and like material.

In the manufacture of grass twine from marsh grass or other material it is the present necessary custom to sort the lengths of material and discard all material less than a certain length in order to form a twine of even diameter.

It is one of the objects of this invention to provide a grass twine machine which will obviate the waste of material and form a grass twine of unvarying thickness throughout its length from grass or other material of varying lengths and thicknesses without changing the adjustment of the machine.

A further object of the invention is to provide a grass twine machine with a vertical, or substantially a vertical feed thereby simplifying the construction and providing a more compact construction than with the ordinary horizontal feed type of machines.

A further object of the invention is to provide a grass twine machine in which the grass or other material holder is positioned directly above the thread or cord wrapping mechanism and the grass or other material is fed directly to the wrapping mechanism without the interposition of intermediate mechanism.

A further object of the invention is to provide a grass twine machine in which both the material holder and the feeder are combined in one simple structure which performs both functions in an efficient manner.

With the above, and other objects in view, the invention consists of the grass twine machine and its parts and combinations as set forth in the claims, and all equivalents thereof.

In the accompanying drawings, in which the same reference characters indicate the same parts in all of the views: Figure 1 is a side view of the complete grass twine machine embodying the improvements, parts shown in section; Fig. 2 is a plan view thereof; Fig. 3 is an end elevation thereof; Fig. 4 is an enlarged detail view of the combined material holder and feeder; and Fig. 5 is a detail view of a modified form of combined holder and feeder.

Referring to the drawings, the numeral 10 indicates the base portion and 11 the main frame of the machine which may be of any suitable and convenient construction necessary to support the operating parts of the machine. The main frame preferably consists of two uprights 12 and 13 upon which is mounted the main drive shaft 14 and the vibrator shaft 15 rotatably connected together by means of an endless belt 16 extending around pulleys mounted on said shafts. The end of the vibrator shaft 15 adjacent to the upright 12 is provided with a vibrator wheel 17 and upon which is supported the free end of a vibratory lever frame 18. The other end of this lever is pivotally connected to the upright 13 of the main frame and the free end which is supported on the vibrator wheel is provided with an adjustable wearing block 19, preferably of wood, to compensate for the wear of the contacting parts. An adjusting screw 20 threaded to the upright 12 and engaging the lever frame 18 serves to limit the engagement of the lever frame with the vibrator wheel and cause more or less vibration of the lever frame. The lever frame is formed and adapted to support a combined grass holder and feeder consisting of a circular receptacle 21 having a conical bottom portion 22 provided with a feed or discharge aperture 23 at its vertex of sufficient size to permit several lengths of grass or other material to pass through it at the same time. The bottom portion is provided at its lowest point with the aperture so that when the combined holder and feeder is vibrated by the vibrator wheel the lengths of grass will work down toward the aperture and pass therethrough in a continuous stream. The side portions of the holder are provided with upstanding spring wire guards 24 which serve to hold the lengths of grass in vertical position and yield sufficiently sidewise to permit the grass to be forced therebetween in charging the holder.

A thread or cord wrapping mechanism 25 positioned immediately beneath the grass holder and feeder is adapted to receive the lengths of grass discharged from the holder in a continuous stream and wrap a thread or cord therearound to form a continuous length of twine of the grass or other material fed thereto. This thread wrapping mechanism consists of a tubular thread shaft 26 journaled on the frame 12 and positioned vertically, immediately beneath the aperture 23 of the grass holder and in axial vertical alinement therewith. The shaft is provided with a spool collar 27 rigidly connected thereto and a collar 28 threaded on the shaft and these collars are adapted to removably hold a spool of wrapping thread 29 between said collars and in position on the shaft. A tension collar 30 loosely surrounds a reduced portion of the tubular shaft above the threaded collar and is provided with a spring tension arm 31 having an eye 32 formed in its free end. The thread from the spool passes through the eye of the spring tension arm and thence to and around the lengths of grass discharging from the feeder and entering into the upper end of the tubular shaft. This tension device is adapted to regulate the tightness of the winding on the grass and to compensate for the variations in diameter of the spool of thread due to the unwinding of the thread therefrom and thus provide an even tension in the winding. The portion of the upper end of the tubular shaft surrounding the opening is beveled to prevent wear on the thread. A vertically extending countershaft 33 journaled on the upright member 11 and having a bevel gear connection 34 with the drive shaft 14 is provided with a belt wheel 35 which is adapted to rotate the tubular shaft by means of a belted connection 36 between the wheel 35 and a pulley 37 carried by the side tubular shaft. A draw roll 38 mounted on the drive shaft and positioned immediately below the lower end of the tubular shaft is adapted to hold the partly wound lengths of grass in a taut position during the operation of wrapping the twine around the grass and to draw the finished product through the tubular shaft. An idle roll 39 carried on the short end of a bell crank lever 40 pivotally connected to the base 10 is adapted to bear and hold the grass twine in close frictional engagement with the draw roll and prevent slipping thereon. The long arm of the bell crank lever carries a weight 41 longitudinally adjustably connected thereto to increase or diminish the frictional engagement of the twine on the draw roller.

The grass twine passes around the draw roll 38 and up over a grooved idler pulley 42 and thence through the guide tube 43 of the traveler nut 44 and is wound on the reel 45. When the reel is filled the bolt 46 which holds the disk top 46' of the reel in position is removed and the roll of twine is removed from the reel. The reel is carried on a reel shaft 47 journaled in a bracket bearing 48 connected to and upstanding from the base frame 10. A belt wheel 49 connected to the reel shaft is provided with yielding friction blocks 50 projecting upwardly therefrom and upon which the lower end of the reel rests to provide a frictional engagement between the reel and the belt wheel and permit the reel to slip on the friction blocks as the diameter of the twine wound on the reel increases in size. A belt 51 extending around the belt wheel 49 and a pulley 52 on the countershaft 33 serves to transmit rotation from said countershaft to the spindle shaft 47.

The traveler nut 44 is threaded to a vertical reversely threaded shaft 53 journaled in a bracket 54 connected to and upstanding from the base frame. The traveler shaft has a belted connection 55 with the reel shaft and is rotated thereby. A stop 56 is provided on the upright 12 to hold the vibrating frame in raised position when it is desired to place a spool of thread on the tubular shaft.

In the modified form of grass holder the bottom portion of the holder is formed with a series of stepped portions 57 provided with apertures 58 reduced in diameter in successive order toward the lower stepped portion to permit the grass to gradually work down and out through the bottom aperture.

In the operation of the machine marsh or other grass is placed in the holder with the butt ends resting on the conical bottom portion of the holder, and a spool of wrapping thread having been placed in position on the tubular shaft and the end of the thread threaded through the eye of the spring arm and tied around some of the lengths of grass extending through the apertures of the holder, the machine is started. The rotation of the vibrating wheel causes the rapid vibration of the grass holder and the grass contained therein to work down the incline of the conical bottom portion and pass out through the aperture in a continuous stream of overlapping lengths of grass and into the conical opening of the tubular shaft. In passing through the space between the holder and the tubular shaft the rotation of the tubular shaft and the spool of thread will tightly wrap the thread around the several overlapping lengths and form a continuous twine of grass or other material used. The draw roll will exert a pull on the wrapped and unwrapped lengths of grass and hold it taut so it will be tightly wound with the thread. The finished twine will then pass up over the idle pulley and through the guide tube of the traveler nut which will cause it to be wound up evenly on the reel spindle for further disposition. The size of the aperture in the conical bottom portion of the holder determines the diameter of the grass twine and forms an even unvarying thickness of twine regardless of the length or thickness of the lengths of grass fed to the machine. As the aperture is of sufficient size to permit the passage therethrough of several lengths of grass at the same time and as the lengths of grass taper to a less diameter toward their tops the lengths of grass will be discharged in successive order and overlap each other and break joints. The butt ends of the grass cannot pass through the aperture except in successive order due to the gradual taper of each length thus providing a regular even feed of material to the twine wrapping mechanism.

While the machine shown and described is adapted to form a twine of a given size it is obvious that holders with different sized apertures may be provided to form twine of various sizes.

From the foregoing description it will be seen that a grass twine machine is provided which is very simple in construction and operation and is adapted to form a continuous grass twine of even thickness from grass or other material of varying lengths and diameters.

What I claim as my invention is:

1. A grass twine machine, comprising a thread wrapping mechanism constructed to receive and wrap lengths of material with a binding thread, a material holder positioned above the wrapping mechanism and provided with an aperture through which the material is fed to the said wrapping mechanism, said holder having its bottom portion shaped to direct the material toward the aperture when the holder is vibrated, and means for vibrating the material holder to move the material to the aperture thereof.

2. A grass twine machine, comprising a thread wrapping mechanism constructed to receive and wrap lengths of material with a binding thread, a material holder having a conical bottom portion provided with a discharge aperture at its vertex through which the material is fed to the said wrapping mechanism, and means for vibrating the material holder to move the material carried by the holder to the aperture thereof.

3. A grass twine machine, comprising a thread wrapping mechanism constructed to receive and wrap lengths of material with a binding thread, a material holder positioned above the wrapping mechanism and having a conical bottom portion provided with a discharge aperture at its vertex through which the material is fed to the said wrapping mechanism, and means for vibrating the material holder to move the material carried by the holder to the aperture thereof.

4. A grass twine machine, comprising a thread wrapping mechanism having a vertically positioned tubular shaft, and a material holder positioned directly above the shaft and having an inclined bottom portion provided with a discharge aperture through its lower portion immediately above the opening of the tubular shaft and through which the material is fed to the shaft, said holder constructed to hold the material extending in a vertical direction and in a line parallel to the axis of the tubular shaft.

5. A grass twine machine, comprising a thread wrapping mechanism having a vertically positioned tubular shaft, a material holder positioned above the shaft and having an inclined bottom portion provided with a discharge aperture through its lower portion immediately above the opening of the tubular shaft and through which the material is fed to the shaft, said inclined bottom portion being shaped to direct the material toward the aperture when the holder is vibrated, and means for vibrating the material holder to move the material carried by the holder to the aperture thereof.

6. A grass twine machine, comprising a thread wrapping mechanism having a tubular shaft extending longitudinally in a direction at an angle to a horizontal line, and a material holder positioned directly above one end of the shaft and adapted and constructed to hold lengths of material substantially in axial alinement with the shaft and having a conical bottom portion provided with a discharge aperture at its lowest point through which the material is fed to the said tubular shaft.

7. A grass twine machine, comprising a thread wrapping mechanism having a tubular shaft extending longitudinally in a direction at an angle to a horizontal line, a material holder adapted and constructed to hold lengths of material substantially in axial alinement with the shaft and having a bottom portion provided with a discharge aperture through which the material is fed to the said tubular shaft, said bottom portion being inclined to direct the material toward the opening when the holder is vibrated, and means for vibrating the material holder to move the material carried by the holder to the aperture thereof.

8. A grass twine machine, comprising a thread wrapping machine constructed to receive and wrap lengths of material with a binding thread, a support, a material holder lever frame pivotally connected to the support, a material holder carried by the lever frame and having an angular bottom portion provided with an aperture through its lower portion through which the material is fed to the wrapping mechanism, and a member carried by the support for vibrating the lever frame to move the material in the holder to the aperture thereof.

9. A grass twine machine, comprising a frame, a thread wrapping mechanism mounted on the frame and having a tubular shaft extending longitudinally in a direction at an angle to a horizontal line, a material holder lever frame pivotally connected to the frame, a material holder carried by the lever frame and having an angular bottom portion provided with an aperture through its lower portion through which the material is fed to the wrapping mechanism, a shaft carried by the frame and provided with a cam for vibrating the material holder frame and the holder carried thereby, and a means for drawing the grass twine through the tubular shaft.

10. A grass twine machine, comprising a frame, a thread wrapping mechanism mounted on the frame having a tubular shaft extending longitudinally in a direction at an angle to a horizontal line, a material holder lever frame pivotally connected to the frame, a material holder carried by the lever frame and having an angular bottom portion provided with an aperture through its lower portion through which the material is fed to the wrapping mechanism, a shaft carried by the frame and provided with a cam for vibrating the material holder frame and the holder carried thereby, a draw roll for pulling the grass twine through the tubular shaft, and a yielding means for holding the twine in frictional engagement with the draw roll.

11. A grass twine machine, comprising a frame, a thread wrapping mechanism mounted on the frame and having a tubular shaft extending longitudinally in a direction at an angle to a horizontal line, a material holder lever frame pivotally connected at one end to the frame and provided with a wearing block at its other end, a material holder carried by the lever frame and having a conical bottom portion provided with an aperture at its vertex through which the material is fed to the wrapping mechanism, a drive shaft journaled on the frame and having a driving connection with the wrapping mechanism, a vibrator shaft journaled on the frame and having a motion transmission connection with the drive shaft, a cam member mounted on the vibrator shaft for vibrating the material holder frame and the holder carried thereby, a draw roll for pulling the grass twine through the tubular shaft, and a yielding means for holding the grass twine in frictional engagement with the draw roll.

12. A grass twine machine, comprising a frame, a thread wrapping mechanism mounted on the frame and having a tubular shaft extending longitudinally in a direction at an angle to a horizontal line, a material holder lever frame pivotally connected at one end to the frame and provided with a wearing block at its other end, a material holder carried by the lever frame and having a conical bottom portion provided with an aperture at its vertex through which the material is fed to the wrapping mechanism, a drive shaft journaled on the frame and having a driving connection with the wrapping mechanism, a vibrator shaft journaled on the frame and having a motion transmission connection with the drive shaft, a cam member mounted on the vibrator shaft for vibrating the material holder frame and the holder carried thereby, a draw roll for pulling the grass twine through the tubular shaft, a yielding means for holding the grass twine in frictional engagement with the draw roll, a guide pulley over which the grass twine extends, a reel upon which the grass twine is wound, a driving connection between the drive shaft and the reel, and a traveler nut mounted on a reversely threaded shaft for guiding the grass twine on the reel.

13. A grass twine machine, comprising a frame, a thread wrapping mechanism mounted on the frame and having a tubular shaft extending longitudinally in a direction at an angle to a horizontal line, a material holder lever pivotally connected at one end to the frame and provided with a wearing block at its other end, a material holder carried by the lever frame and having a conical bottom portion provided with an aperture at its vertex through which the material is fed to the wrapping mechanism, yielding arms extending upwardly from the material holder to hold the material in upright position, a drive shaft journaled on the frame and having a driving connection with the wrapping mechanism, a vibrator shaft journaled on the frame and having a motion transmission connection with the drive shaft, a cam member mounted on the vibrator shaft for vibrating the material holder frame and the holder carried thereby, a draw roll for pulling the grass twine through the tubular shaft, and a yielding means for holding the grass twine in frictional engagement with the draw roll.

14. A grass twine machine, comprising a base portion provided with uprights, a drive shaft journaled on the frame and provided with a bevel gear and a pulley, a countershaft journaled on one of the uprights and provided with a bevel gear in mesh with the bevel gear of the drive shaft, said countershaft also provided with a pulley and with a wheel, a thread wrapping mechanism journaled on one of the uprights and having a tubular shaft extending vertically longitudinally, a material holder lever frame pivotally connected at one end of the uprights and provided with an adjustable wearing block at its other end, a material holder carried by the lever frame and having a conical bottom portion provided with an aperture at its vertex through which the material is fed to the wrapping mechanism, yielding arms extending upwardly from the material holder to hold the material in upright position, a vibrator shaft journaled on the two uprights and provided with a cam wheel positioned to engage and vibrate the wearing block and parts connected thereto, an adjustable means for supporting the free end of the material holder lever frame, a belt connection between the pulley of the drive shaft and a pulley on the vibrator shaft, a belt connection between the wheel of the countershaft and the wrapping mechanism, a draw roll mounted on the drive shaft positioned to engage and draw the grass twine through the tubular shaft, a reel shaft mounted on the frame and provided with a belt wheel having a belt connection with the pulley of the countershaft, a reel journaled on the reel shaft and having a frictional engagement with the belt wheel, a reversely threaded shaft mounted on the frame, a traveler nut threaded to the reversely threaded shaft and provided with a grass twine guide, and a motion transmission connection between the reel shaft and the reversely threaded shaft.

15. A feeding device for grass twine machines, comprising a material holder consisting of a receptacle having an inclined bottom portion provided with an aperture at its lower portion through which the material is discharged, said inclined bottom portion being shaped to direct the material toward the aperture when the holder is vibrated, and means for vibrating the receptacle to move the material through the aperture.

16. A feeding device for grass twine machines, comprising a material holder consisting of a receptacle having an inclined bottom portion provided with an aperture at its lower portion through which the material is discharged, said inclined bottom portion being shaped to direct the material toward the aperture when the holder is vibrated, means for drawing material through the aperture, and means for vibrating the receptacle to move the material through the aperture.

17. A feeding device for grass twine machines, comprising a material holder consisting of a receptacle having a conical bottom portion provided with an aperture at its vertex through which the material is discharged, draw rollers positioned beneath the conical bottom portion, and means for vibrating the receptacle.

In testimony whereof, I affix my signature, in presence of two witnesses.

EDWARD W. GOODRICK.

Witnesses:
GEO. O. SANDERS,
JULIUS H. KIEL.